United States Patent [19]

Mayhak

[11] Patent Number: 5,339,961
[45] Date of Patent: Aug. 23, 1994

[54] DEBAGGER SORTER MACHINE

[75] Inventor: Richard L. Mayhak, Apple Valley, Minn.

[73] Assignee: Recycling Specialists, Inc., Northfield, Minn.

[21] Appl. No.: 148,426

[22] Filed: Nov. 8, 1993

Related U.S. Application Data

[63] Continuation of Ser. No. 817,775, Jan. 8, 1992, abandoned.

[51] Int. Cl.⁵ .................... B03B 1/00; B65B 69/00
[52] U.S. Cl. .................................. 209/3; 209/244; 209/930; 241/79.2; 241/167; 241/DIG. 38; 83/946; 414/412
[58] Field of Search ............ 209/3, 3.1, 44.1, 44.2, 209/28, 29, 36, 37, 235, 240, 244, 245, 930; 414/412; 241/79.1, 79.2, 166, 167, 169.1, 224, 225, 236, DIG. 38, 193, 194; 83/155, 165, 923, 946

[56] References Cited

U.S. PATENT DOCUMENTS

| | | | |
|---|---|---|---|
| 1,491,211 | 4/1924 | Taylor | 209/37 X |
| 1,916,531 | 7/1933 | Robb | 414/412 |
| 2,548,142 | 4/1951 | Carter | 209/37 X |
| 2,660,324 | 11/1953 | Trautschold | 414/412 |
| 3,447,706 | 6/1969 | Moriarty | 414/412 |
| 3,891,105 | 6/1975 | Cerroni | 414/412 |
| 4,119,227 | 10/1978 | Hafner et al. | 414/412 |
| 4,265,584 | 5/1981 | Duwell et al. | 414/412 |
| 4,278,383 | 7/1981 | Mueller et al. | 414/412 |
| 4,504,183 | 3/1985 | Bennison et al. | 414/412 |
| 4,515,509 | 5/1985 | Frisz | 414/412 |
| 4,725,184 | 2/1988 | Bennison | 414/412 |
| 4,798,508 | 1/1989 | Lewis | 414/412 |
| 4,854,507 | 8/1989 | Smith | 241/194 X |
| 4,995,770 | 2/1991 | Crane | 414/412 |
| 5,002,451 | 3/1991 | Hale et al. | 414/412 |
| 5,007,787 | 4/1991 | Schnader | 414/412 |
| 5,062,576 | 11/1991 | Burda | 241/167 |
| 5,148,996 | 9/1992 | Fletcher et al. | 241/224 X |

FOREIGN PATENT DOCUMENTS

| | | | |
|---|---|---|---|
| 1514670 | 10/1989 | U.S.S.R. | 414/412 |
| 2226778 | 7/1990 | United Kingdom | 241/166 |

*Primary Examiner*—D. Glenn Dayoan
*Assistant Examiner*—Tuan N. Nguyen
*Attorney, Agent, or Firm*—Haugen and Nikolai

[57] ABSTRACT

A machine for removing yard waste from bags and for sorting the waste. Filled bags dropped into a hopper have offset slashes cut in opposite sides by blades mounted upon two rotary shafts. The blades are pivoted to minimize solid tramp waste damage, and are mounted in opposing pairs for balance. Guards, extending inward from opposed parallel hopper sides enclose each shaft and direct the bags between them. Slots through the guards in the blade paths permit the blades to pass through. Flexible wipers between backing plates extend inward from both sides of the slots parallel to the blade paths to bear against the blades. The cut bags fall onto a conveyor which carries them to the top of an inclined vibrating screen. The screen is sized to pass yard waste but not bags, bag parts or tramp material. Conveyors under the screen carry the yard waste away for disposal.

12 Claims, 7 Drawing Sheets

DEBAGGER SORTER MACHINE

This is a continuation of copending application Ser. No. 07/817,775, filed on Jan. 8, 1992.

Field of the Invention

This invention relates to a machine for removing yard waste and any tramp material from bags and sorting the yard waste, bags and tramp material from each other in the immense quantities required for large municipality yard waste compositing.

BACKGROUND OF THE INVENTION

A number of states have recently enacted legislation requiring that yard waste, consisting essentially of grass clippings and leaves, be composted rather than buried in landfills. Since most of this yard waste is collected in plastic or paper bags, in order to compost this yard waste in large metropolitan areas, an immense quantity of yard waste must be removed from the bags and the yard waste sorted from the bags.

These new requirements are not been met by any existing inventions. In Robb, U.S. Pat. No. 1,916,531; a cement sack is carried upward by a bucket attached to a conveyor, inverted over a cutting wheel while being held by penetrating members and dumped into a container. This operation can only cut a single bag open at a time and requires that the bag be relatively sturdy in order to be held inverted by penetrating members. Further, the contents must be relatively dense to simply be spilled out of an inverted container.

In Moriarty, U.S. Pat. No. 3,447,706 a bag opening and emptying machine uses reciprocating knives driven by pistons across and through the bottom of a single filled bag supported by a number of rods. These rods are vibrated by a separate mechanism to cause material within the bag to fall through the rods. A set of bag ejecting tines interleaved with the rods are raised after the bag is emptied to eject the bag. In Cerroni, U.S. Pat. No. 3,891,105; spikes are used to draw a bag against a single knife to cut the bag open.

In Hafner et al., U.S. Pat. No. 4,119,227 a rotary knife arranged between two belts cuts bags carried in series by the belts past the knife. In Mueller et al, U.S. Pat. No. 4,278,383 pins extending outward from a drive chain carry filled bags horizontally through the machine into a cutting disk mounted upon and driven by a shaft. This machine makes a cut through the a single bag at a time, and has no special provision to keep the bag material from the cutting disk shaft.

In Bennison et al., U.S. Pat No. 4,504,183 a bag opening machine has an endless conveying band provided with spikes which conveys a series on bags impaled on the spikes in single file individually past cutting disks. After being cut the contents are emptied into receiving means while the bags are carried along until further until the bags are released by retracting the spikes. In Frisz, U.S. Pat. No. 4,515,509 bags are carried by a conveyor in series to a plurality of bag opening stations. Each station includes a driven chain loop with a plurality of outwardly extending fingers which engage the bags as they go past and either pierce the bags or lift them so the bag weight causes the fingers to pierce the bags. The bags also fall onto a conveyor belt which in combination with the piercing effects bag opening and content removal.

In Bennison, U.S. Pat. No. 4,725,184 bags are carried in series past rotating slitters to be cut into an upper and a lower half. Screening means are provided such that the contents can fall through but the bag halves cannot. In Lewis, U.S. Pat. 4,798,508 filled bags are carried in series by and between a pair of rotating drums, having several rows of rigid spikes, past a fixed blade, which slits the bag in half to empty the contents. Each empty bag half is carried on one of the rotating drums to apoint where the spikes move away to release the empty bag half. In Crane, U.S. Pat. No. 4,995,770 bags are placed within a receptacle which is pivotably attached to the rear end of a refuse truck. The receptacle is movable between an upright position and an inverted position over the truck bed. While in the upright position filled bags are placed within the receptacle which has a grate-like structure consisting of a plurality of laterally spaced bars above a rupturing mechanism in the form of generally parallel drums having circumferential rows of cutting teeth which can protrude through the grate. Bags placed within the receptacle have the end ruptured by these cutting teeth which are then be removed manually. After the bags are removed the receptacle containing the yard waste is inverted over the track. The capacity of this apparatus is small since a major portion of the operation is manual, and further there is no attempt to sort the small bag pieces resulting from the cutting teeth from the yard waste.

None of these inventions provide the immense capacity necessary to process the amount of bagged yard waste in large metropolitan areas. In the prior art in general bags are processed in sequence which automatically limits the maximum processing rate whereas in the instant invention a number of bags can be slashed open at the same time. In addition, most of these prior inventions make no provisi for sorting the bags from the material while those that do are also greatly limited in the speed in which they can separate the two, either because part of the sorting is manual or because of the intrinsic slow nature of the process used.

SUMMARY OF THE INVENTION

This machine is arranged to cut long offset slashes on opposite sides of filled bags, whether made of plastic, paper or any other material, remove all of the material from within the bags, sort the yard waste from the bags and from any tramp material which may be present, sort the bags from the tramp material, and dispose of these three items in three separate streams.

This machine uses an inclined first conveyor which extends from ground level to a position over a large elevated hopper. The first conveyor conveys closed bags of yard waste from ground level upward and discharges the bags into the hopper which contains rotary cutting blades. This first conveyor, and all of the other conveyors in this machine, have inclined sides extending upward and outward to keep conveyed material on the conveyor. The speed of this first conveyor is adjusted to the bag rate per unit of time which the cutting means can process.

The bags fall into the hopper where they are slashed open by the rotary blades, which are attached to two parallel shafts mounted within the hopper, each shaft being driven by a hydraulic motor. These shafts are horizontal and counter-rotating. The blades consist of thin steel bars pivotally attached in aligned pairs to opposite sides of each shaft to maintain balance. The blades are attached with their thin edges perpendicular to the shaft axis. The thin leading edge of the blade may or may not require sharpening depending upon the bar thickness and yard waste material characteristics. The pivotal mounting of the blades prevents damage when the yard waste contains solid tramp material, such as rocks, in that the blade will simply swing out of the way of the solid material. This pivotal mounting also permits removing the blades readily for sharpening and replacement.

Bags conveyed to the top of the hopper by the first conveyor are directed between these two shafts by inclined hopper sides where they are cut by the blades. One shaft has an odd number of blade pairs and the other shaft has an even number of blade pairs. The spacing between adjacent blade pairs is the same on both shafts, however blades from the two shafts are offset one-half of the spacing from each other to interleave the knife paths. The direction of rotation of the shafts move both sets of blades downward at the center of the hopper, which also assists in driving the bags downward. The length of the blades and the shaft spacing is made such that long opposed slashes, which will usually not sever the bag into multiple pieces, are made on opposite sides of bags passing between the shafts. The blades are widely spaced such that even if a bag is completely cut through large bag pieces will result. The large sizes of the bags and bag pieces relative to the yard waste components permits a later sorting of the bags and bag pieces from the yard waste.

The hopper is quite large, and along with the descending rotating knives, which both cut and propel the bags downward, provides a machine which can process immense quantities of yard waste. A large capacity is essential for the great volume of yard waste to be processed at a municipal or private composting station.

A major problem with prior art machines having rotating members, particularly when the bags are made of plastic, is that sheet plastic material will readily wrap around a rotating shaft, and quickly build up into a mass capable of stopping or breaking any machine. This problem is avoided in the present invention by preventing the bag material from coming into contact with the rotating shafts. Guards extend from opposite sides of the hopper parallel to the shafts, down and around the adjacent shaft, and then outward back to the same side. Slots in the guards, aligned with the path of each blade, allow the blades to pass through the guards. These guards cover both shafts, and direct the bags between the shafts where they are being cut. Wipers made of heavy fiber reinforced elastomeric belting are sandwiched between a pair of metal backing plates such that only a portion of the flexible wiper blade extends outward along one side. These backing plate supported wipers are mounted on both sides of the slots such that the flexible wiper material extends to a location overlapping the blade slot. As such, the blades bear against the wipers as the blades pass through the slots. The position of each of the two backing plates and the wiper sandwiched therebetween can all be adjusted individually in a direction perpendicular to the slot. Changing the amount the wiper extends beyond the backing plates changes the effective wiper stiffness. Changing the effective stiffness in this manner, and changing the amount the wipers extend over the slot, act together to change the force which the blades exert against the wipers as they pass through the slot. This force is adjusted, by changing these two parameters, until the force which the blades exert against the wipers is large enough to cut the bag material interposed between the blade and the wipers, rather than dragging the bag material through the slot. This prevents any bag material from being carried by the blades to the rotating shafts supporting the blades, since the bag material is cut between the blade and the wipers rather than being carried through the slot. This operation keeps the bag material away from the rotating shafts and prevents any plastic build-up around the shafts.

The slashed bags, which are driven downward by both the blades and by gravity, fall between the guards at the center of the hopper onto a second inclined conveyor. This second conveyor carries the bags and yard waste upward and drops them upon the highest end of a driven inclined vibrating screen. The dropping of the bags onto the second conveyors and then onto the screen will spill some of the yard waste outward through the slashed sides of the bags.

The inclined portion of the screen is aligned with and slopes away from the second conveyor. The screen has grid openings several inches across which are large enough to allow the yard waste to fall through but small enough to block the larger bag and bag pieces.

The screen is supported and secured to an upwardly open frame, which is the upper portion of a rectangular shaped supporting structure. This entire supporting structure is mounted on four U-shaped springs at each corner. The entire screen supporting structure and secured screen are vibrated by a driven rotating unbalanced shaft mounted under and upon this supporting structure. Means are provided to change the amount of the offset weight. The shaft speed can be adjusted, screens of different sizes can readily be substituted, the screen slope can be changed, and the offset weight can be changed to accommodate the different screening requirements for grass, leaves, or different percentages of each.

After the yard waste is dumped upon the upper end of the inclined screen, the vibration of the inclined screen will cause the bags and yard waste material to move down the screen, and will also cause the yard waste to vibrate out of the bags and fall through the screen while the larger bags and bag pieces remain on top. The various screen parameters described above are changed by the operator until all of the yard waste material vibrates free of the bags to fall through the screen before the bags and bag pieces reach the low end of the screen. As discussed previously, the results of the previous cutting operation are vital to this sorting operation, since the long slashes on opposite sides of the bags permits the yard waste to be emptied from the bags by the screen vibration, while the large size of the bags and bag pieces relative to the yard waste elements makes this sorting process based on relative size possible.

The yard waste which falls through the screen falls onto a horizontal third conveyor. This third conveyor is aligned with and extends completely under the length of the screen, and has inclined extensions reaching to the edge of the screen to receive all of the yard waste falling through the screen. This third conveyor carries the yard waste in the direction opposite to the screen's downward slope, and dumps the yard waste onto the lower end of an inclined fourth conveyor which is perpendicular to the third conveyor. This fourth conveyor extends outward and upward away from the machine and carries the yard waste away for disposal.

The bag and bag pieces continue down the screen to the low end where a blower is mounted above the screen. The blower is enclosed by a hood which has a downward opening. The blower blows the bag and bag parts off the screen to one side where they are collected and disposed of separately. Tramp material, too large to fit through the screens and too heavy to be ejected by the blower, simply vibrate off the lowest end of the screen, to be collected and disposed of separately. The blower can be eliminated if the amount of tramp material is small, such that separating the tramp material from the bags and bag pieces is unnecessary, and the bags, bag pieces, and tramp material all allowed to vibrate off the low end of the screen to disposed of together.

The two blade shafts, the four conveyors, the screen vibrator shaft, and the blower are each powered by a separate hydraulic motor. A diesel engine driving hydraulic pumps provides power for these motors. Each hydraulic motor has its own control valve for independent speed adjustment. The different requirements of the various machine operations for grass, leaves, or a ratio of the two, can be obtained readily by the screen changes and adjustments discussed previously, and by motor speed adjustments for the other operations.

This machine can process huge quantities of bags in a short period of time because of its large size and because the use of opposed counter-rotating blades permits a number of bags to fall through the hopper together in parallel which provides an extremely rapid cutting process. The counter-rotating shafts also assist in moving the bags downward through the hopper more rapidly than gravity would alone which also increases the capacity of this operation. The use of blades mounted upon a rotating shaft would not be feasible without the wipers to keep the bag material from the rotating shafts. The widely spaced long slashes on opposite sides of the bags of the blades permits the use of a high capacity vibrating screen to readily and rapidly separate the yard waste from the bags and tramp material.

DETAILED DESCRIPTION OF PREFERRED EMBODIMENT

Figure 1:
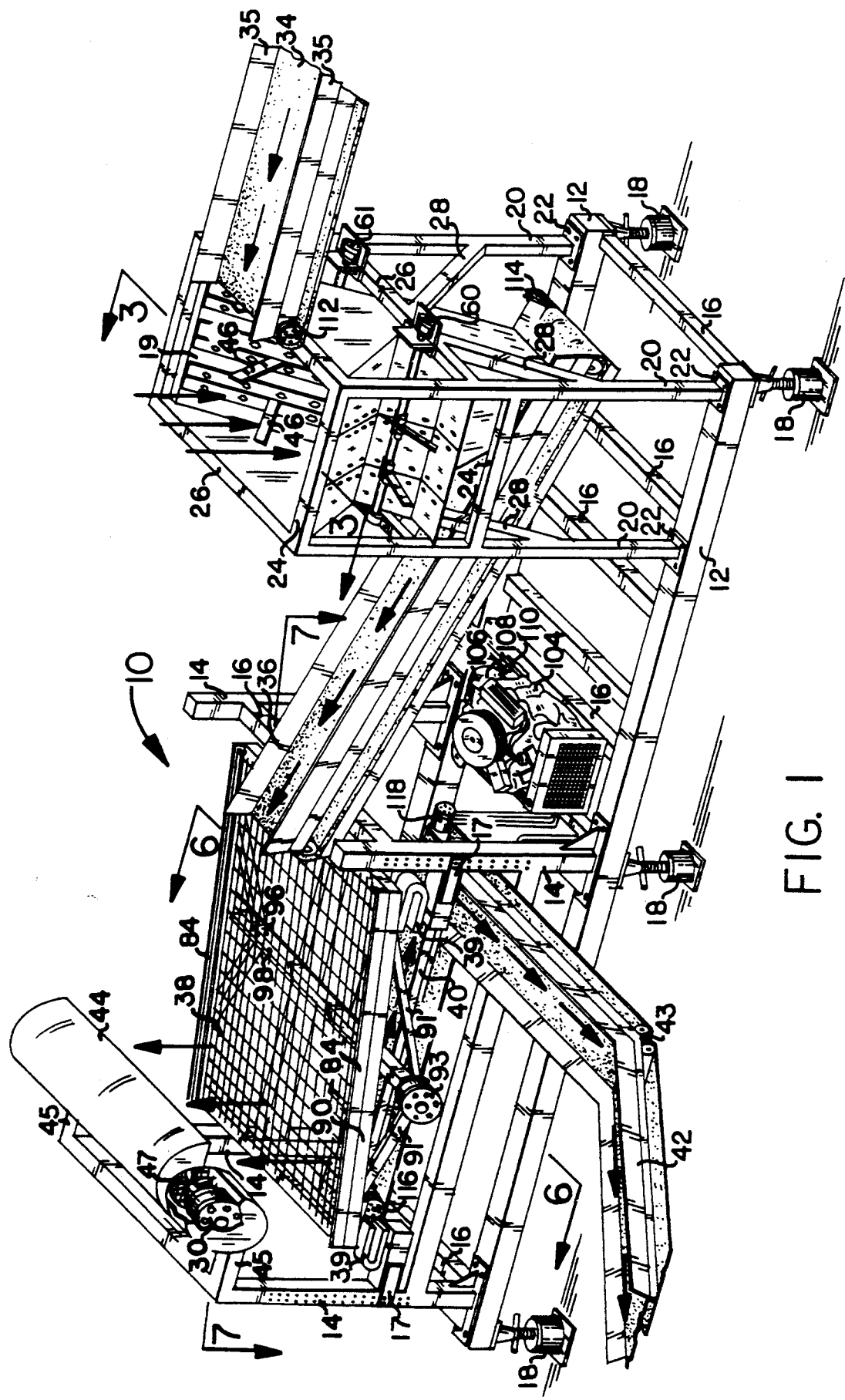
FIG. 1 is a perspective view of the debagging sorting machine.

The debagger sorter machine 10 in accordance with the present invention is shown in FIG. 1. A steel frame structure is made up of beams 12, uprights 14 and horizontal spacers 16 welded together to provide a foundation for the entire machine. Four horizontal supporting studs 17, bolted to uprights 14, provide an adjusting means which will be described later. Six jackscrews 18, four on each end and two in the middle of beams 12, support the structure and permit leveling. Jackscrews 18 are removed when the machine is moved from site to site, which can be accomplished either by using a flat bed trailer, or by attaching a set of dual wheels and a pin to the machine attached to opposite end spacers 16 to pull the machine using a semi-tractor. To give the reader an appreciation for the actual size of the unit, its general dimensions may be twelve feet high by eight feet wide by forty feet long with a weight of approximately ten tons.

A hopper 19 is supported by four vertical supports 20 welded to steel pads 22, which in turn are bolted to horizontal beams 12. Short cross-braces 24, long cross-braces 26, diagonal braces 28 and vertical supports 20 are welded together for the supporting structure of hopper 19. Hopper 19 holds a cutter mechanism for cutting slices on opposite sides of bags as they fall through the hopper, all as will be described later. The upper portion of a belt conveyor, first conveyor 34, which conveys bags from the ground into hopper 19, is shown. The other portion of conveyor 34, not shown, extends to the ground to receive the bags of yard waste. First conveyor 34 has sides 35 extending upward from the belt edges, as do all the other conveyors of this machine, to keep conveyed material on the belt.

A belt conveyor, second conveyor 36, inclines upward from the discharge end of hopper 19 to a location over the upper end of an inclined screen 38. Conveyor 36 thus carries material falling through hopper 19 to the upper end of screen 38. As can be seen in FIG. 1, screen 38 slopes downwards away from conveyor 36. Screen 38 has square grid openings which are only a few inches across. This screen size is sufficient to pass yard waste, which may be intermingled following the slicing operation, but to block the larger bags and bag parts. The supporting structure 90 for screen 38 has four U-shaped springs 39 attached between each lower corner and supporting Studs 17. The supporting structure and screen 38 are vibrated by a mechanism to be described later. This vibration of screen 38 will cause yard waste within bags to vibrate out of the bags and fall through the screen, and will also cause everything on top of the screen to move toward its low end. This will result in all of the yard waste falling through the screen, while the bags and bag pieces and any tramp material too large to fall through the screen will be carried to the low end of the screen.

Figure 6:
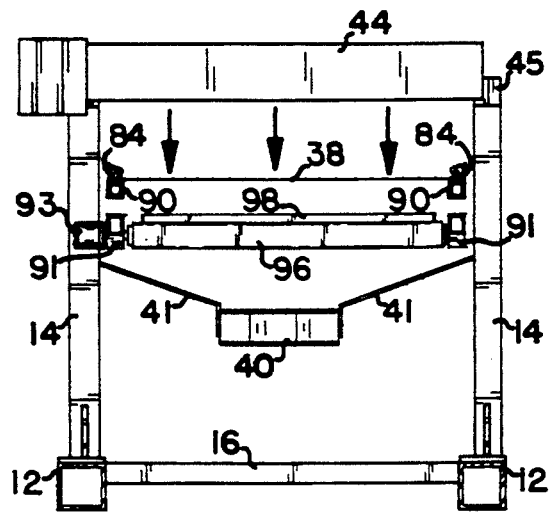
FIG. 6 is a cross-section of the debagging sorting machine taken along 6—6 of FIG. 1.

A belt conveyor, third conveyor 40, is aligned with the inclined dimension of screen 38. Third conveyor 40 has sides 41, shown in FIG. 6, extending outward from the belt under the entire screen 38, so all of the yard waste falling through the screen will be deposited upon this conveyor. Third conveyor 40 carries the yard waste in the direction opposite to the screen slope to a position over one end of a belt conveyor, fourth conveyor 42, which is perpendicular to the third conveyor and extends outward from the machine. Fourth conveyor 42 is made up of an inner horizontal section, and an outer inclined section connected by hinge 43. The inner section of conveyor 42 receives the yard waste from third conveyor 40, while the outer section receives the yard waste from the first section and carries it upward to a truck or a pile for composting or other disposal. Hinge 43 provides an angle adjusting means for the outer section of conveyor 42.

Hood 44 is mounted above the low end of inclined screen 38 on studs 45 which are welded to uprights 14. Hood 44 contains a fan 47 driven by hydraulic motor 30. Hood 44 is semi-circular in cross-section with a downward opening, arranged such that fan 47 will lift the bags and bag parts from the screen and eject them to the rear of the machine, as viewed in FIG. 1.

Any tramp material, i.e., material which did not fall through the screen or which was not ejected from the screen by the blower, will vibrate off the low end of screen 38 where it can be collected separately.

The cutting mechanism contained within hopper 19 uses rotary blades 46, shown in FIGS. 1, 2, 3, 4, and 5, to cut openings in the bags. Blades 46 are pivotally mounted in pairs on the opposite sides of shafts 48 and 49 to balance the shafts.

Figure 3:
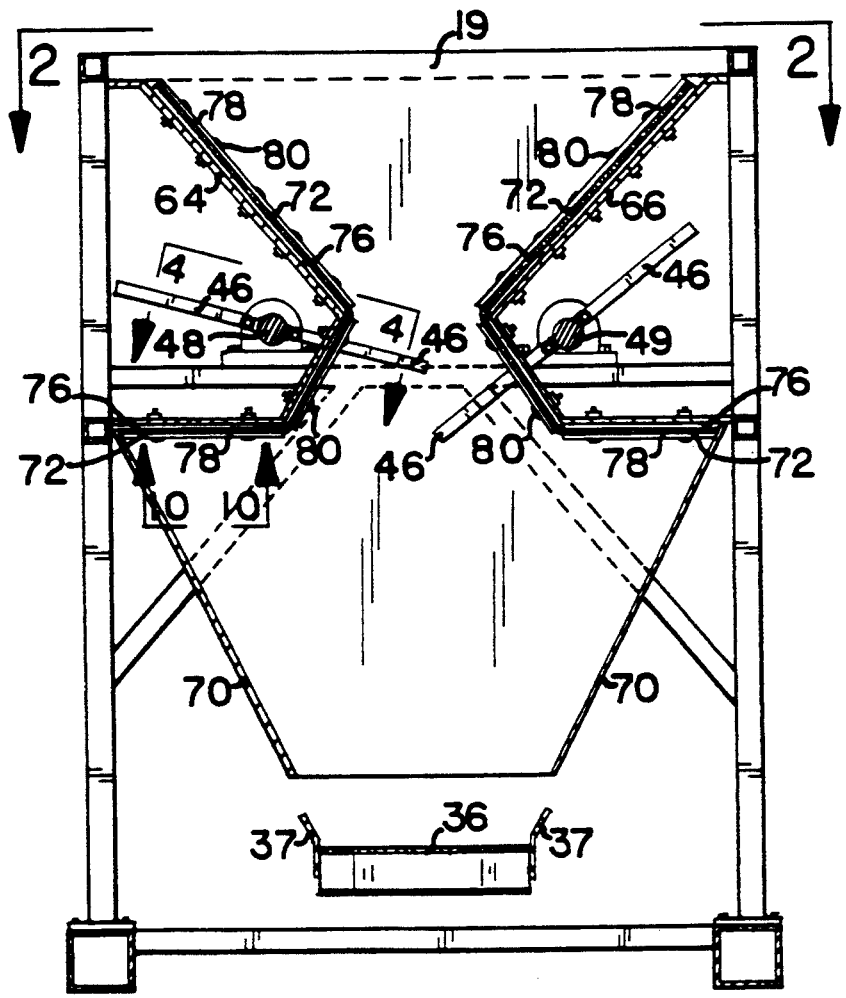
FIG. 3 is a side view of the hopper of FIG. 1 with the facing side panel removed.
Figure 4:
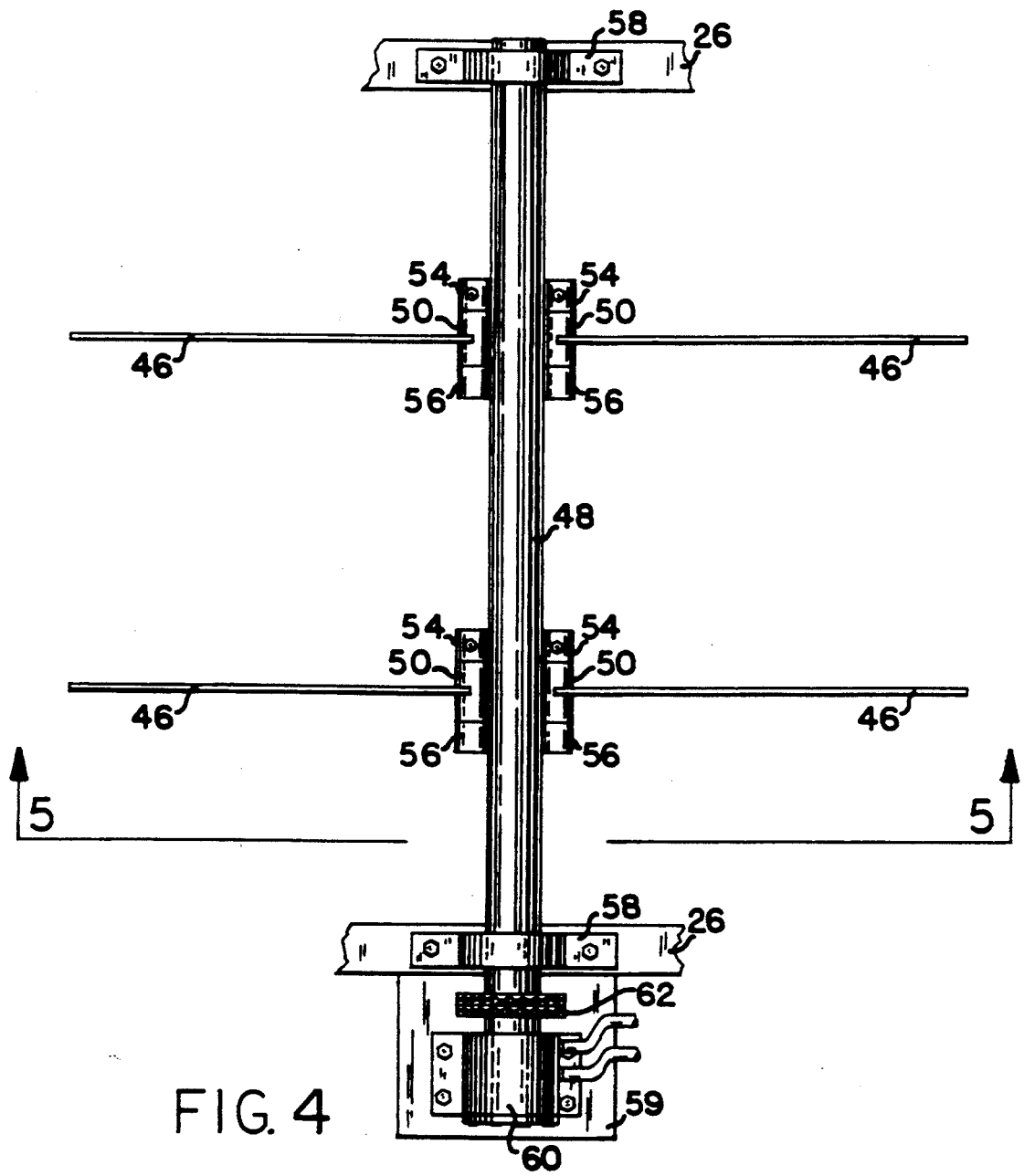
FIG. 4 is a top view of a blade shaft and adjacent supporting structure showing the pivoting blades used in the machine of FIG. 1.
Figure 5:
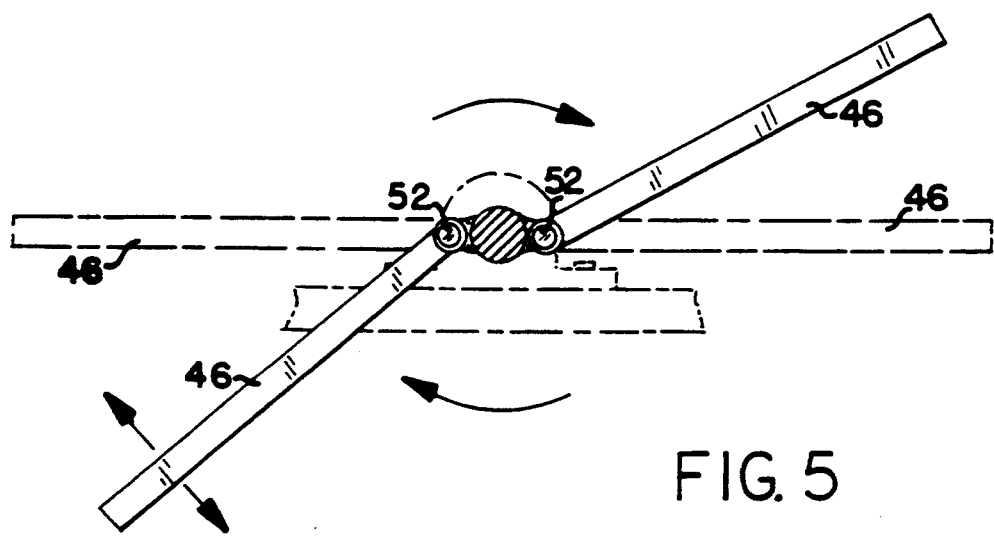
FIG. 5 is an end view of FIG. 4 taken along 5—5 showing the cross-section of a shaft and pivoting blades with one position of the blades shown in solid outline and another position in dashed outline, and with the adjacent supporting structure also shown in dashed outline.
Figure 11:
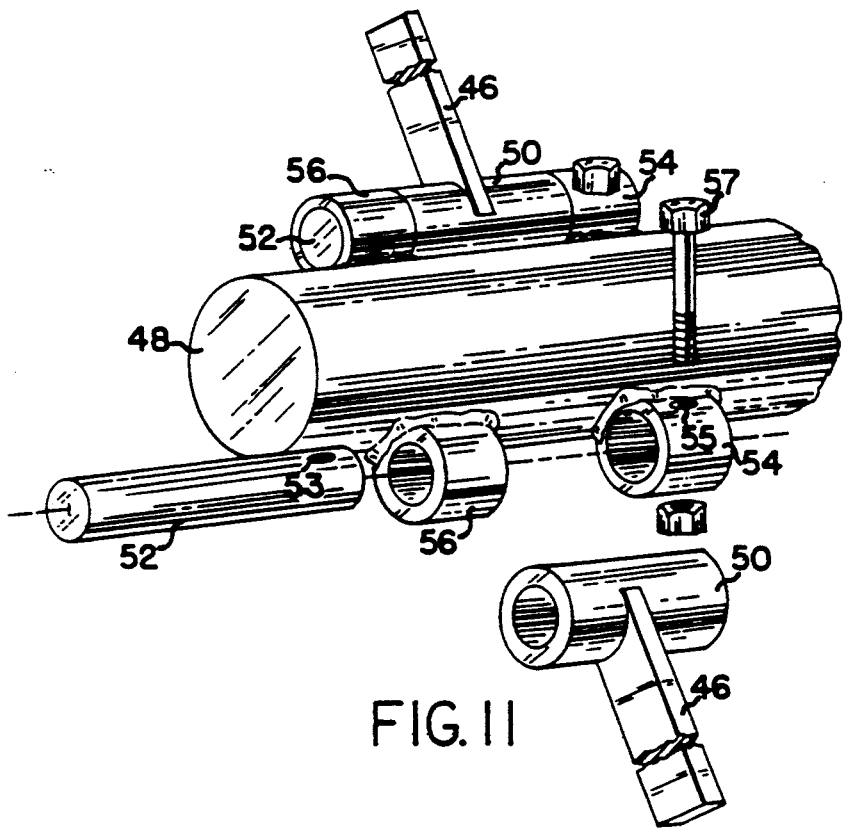
FIG. 11 is an isometric view of a portion of a blade shaft showing an attached upper blade and an exploded view of a lower blade before attachment.

The pivotal mounting of two pairs of blades 46 upon shaft 48 are shown in FIGS. 4, 5 and 11. Shaft 49, shown in FIG. 3, uses the same mounting arrangement for blades 46, but has three pairs of blades rather than two. The parts used to mount a single blade 46 includes sleeve 50, pin 52, and brackets 54 and 56.

Sleeve 50, and brackets 54 and 56 are cut from the same piece of steel pipe to produce identical cross-sectioned cylinders. Steel pin 52 is sized to slideably and rotatably fit within the cylindrical axial openings of these parts. Steel blade 46 has one semi-circular shaped concave end which is cut to fit around sleeve 50 welded to the sleeve. Pin 52 has a hole 53 and bracket 54 has a hole 55 extending through them, both holes being perpendicular to the cylindrical axis, the same size to accept bolt 57, and the same distance from the respective nearer axial end. Blade brackets 54 and 56 are welded to shaft 48 on opposite sides of shaft 48 in pairs to maintain the shaft balance. As can be seen in FIG. 11, bracket 54 is welded to shaft 48, with hole 55 oriented approximately ninety degrees around the bracket from the attachment point. This insures that bolt 57 can be inserted into hole 55 without interference from shaft 48. Each pair of brackets 52 and 54 on a given side of shaft 48 are attached with their cylindrical axis aligned, and spaced slightly further apart than the length of sleeve 50. Upper blade 46 is shown attached to shaft 48, while the lower blade is shown in exploded view before attachment. Lower blade 46 is pivotally attached to shaft 48 by placing sleeve 50 between brackets 54 and 56 until the cylindrical axis through the sleeve is aligned with the bracket cylindrical axes. Pin 52 is then inserted completely through these aligned cylindrical holes through bracket 56, sleeve 50 and bracket 54, and then rotated until hole 53 through pin 52 is aligned with hole 55 through sleeve 54. Bolt 57 is then inserted through holes 53 and 55 and secured by a nut to keep pin 52 in place within sleeve 50, bracket 54 and bracket 56. Since pin 52 is sized to rotate within sleeve 50, this attachment provides rotational freedom for blade 46 through an angle which is limited by the opposite outer edges of the blade striking cylinder 48. This angle is large enough to deflect and absorb any shock imposed upon blades 46 by a large solid piece of tramp material, such as large rocks or thick branches, striking the blade. This pivotable freedom is illustrated in FIG. 5, where blades 46 are shown in a first angular position with respect to shaft 48 in solid outline, and in a second angular position in dashed outline.

Shaft 48, shown in FIG. 4, is pivotally mounted within bearings 58 on opposite ends of the shaft, which are bolted to opposed long cross-braces 26 of the tower support structure. A mounting plate 59 is welded to cross-brace 26, and the brackets of hydraulic motor 60 are attached to this plate. The shaft of motor 60 is attached to shaft 48 through chain coupler 62 to provide power to the shaft. Shaft 49 uses an identical arrangement for its driving power.

Figure 2:
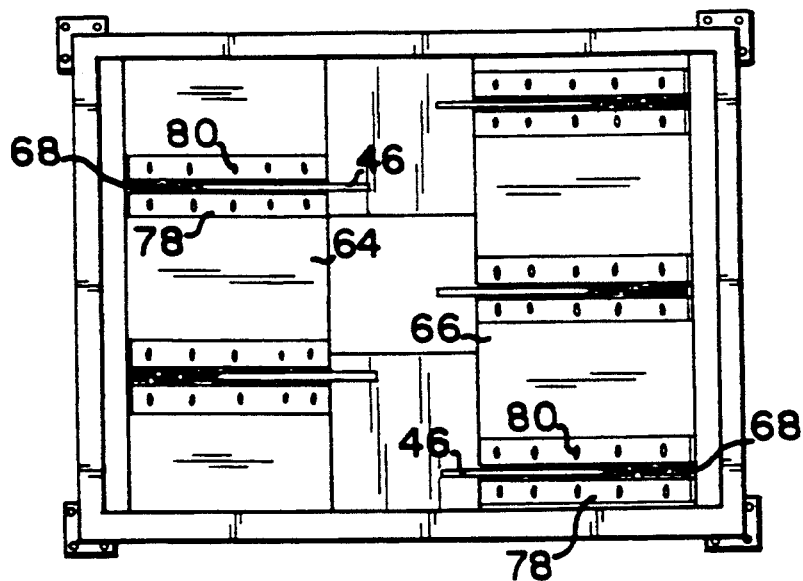
FIG. 2 is a top view of the hopper portion of FIG. 1 taken along 2—2 of FIG. 3.

FIGS. 2 and 3 show guards 64 and 66 which form two inclined opposed side walls of the upper portion of hopper 19, with the other two side walls comprising vertically disposed steel sheets. Guards 64 and 66 extend inward and downward at approximately 45 degrees from horizontal to a point horizontally opposite shafts 48 and 49, and then flare outward and downward from that point at approximately 45 degrees from the horizontal around their respective shafts 48 and 49, and then outward horizontally back to the respective starting side. Guard 64 has two slots 68 and guard 66 has three slots 68, which extend completely through the guards in the paths traversed by blades 46, to allow the blades to rotate through the guards. The lower end of hopper 19 beyond guards 64 and 66 has inclined sheet steel sides 70 which direct all material falling between guards 64 and 66 between inclined sides 37 of second conveyor 36. The sides of hopper 19 perpendicular to guards 64 and 66 are covered by planar steel sheets to completely enclose the path of the material falling through the hopper.

Figure 10:
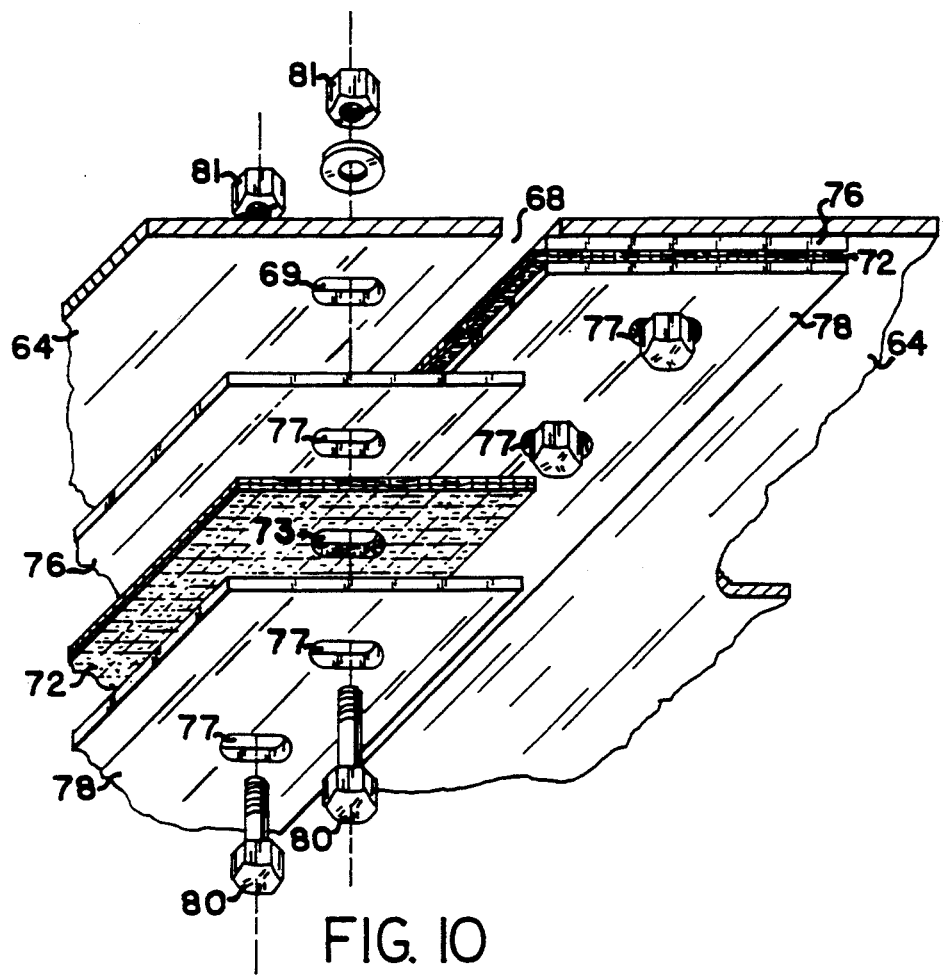
FIG. 10 is an isometric view of a portion of a guards incorporated in the hopper of FIG. 2 showing the wiper and backing plate attachment and adjustment means for a blade slot.

A detail of a portion of slot 68 in guard 64 is shown in FIG. 10. This detail shows the attachment means and adjustment means for all the blade wipers 72 which are made of heavy, cord-reinforced, belting. Wipers 72 extend inward over the length of each adjacent slot from the opposed edges of the respective slots parallel to the blade path on both guard 64 and guard 66. Belt wiper 72 is attached to the side of the guards 64 and 66 opposite to shafts 48 and 49. Both guards 64 and 66 have a number of equal sized and equally spaced, elongated, adjustment holes 69. Holes 69 are all set back the same distance from the edges of slot 68, with their elongated dimension perpendicular to the slots. As is shown, rectangular shaped wiper 72 is sandwiched between two rectangular shaped metal backing plates 76, and 78. Wiper 72 has elongated adjustment holes 73 and backing plates 76 and 78 have adjustment holes 77. Adjustment holes 73 and 77 are the same size, with the same spacing, and the same perpendicular orientation to their edges as holes 69. Adjustment holes 73 are set back identical distances from the adjacent edges of wipers 72, and adjustment holes 77 are set back identical distances from the adjacent edges of their respective backing plate 76 and 78. These parts are mounted upon the guards 64 and 66, with wipers 72 sandwiched between aligned plates 76 and 78, such that the edges adjacent to a slot 68 are parallel to the slot. Wipers 72 thus extend laterally outward over the adjacent edges of plates 76 and 78 and partially over the underlying slot 68, with the adjustment holes 73 of wipers 72, and 77 of plates 76 and 78, and hole 69 of either guard 64 or 66, being overlapped such as to provide an opening for bolts 80. These parts and a washer are then attached to guard 64 by bolts 80 which are secured in place by matching nuts 81. As shown in FIG. 10, the left side of slot 68 through guard 68 is shown with the parts in exploded view before attachment, and the right side of the slot is shown with the parts attached.

This simple adjusting means permits changing the amount that the cord reinforced wiper extends outward from the backing plates, and also permits changing the amount the wiper extends over the slots independently in one operation. These adjustments can readily be changed until the bag material is always cut by blades 46 rather than being carried through slots 68 to wrap about shafts 48 and 49.

FIG. 2 shows backing plates 78 and wiper 72, mounted on the inside of hopper 19. In FIG. 3, wiper 72 backing plates 76 and 78 can all be seen. The portion of wiper 72 which is attached to slots 68 below shafts 48 and 49 is the most critical, since here the blades enter the space adjacent to the shafts and could carry bags and bag pieces to the shafts. The portion of wiper 72 which is attached above shafts 48 and 49 is not too critical, since here, the blades exit the space adjacent to the shafts to carry the bags and bag pieces away from the shafts. However, even though the upper portions of slots 68 are not critical, they are still closed by wipers 72 to prevent any material from falling from the top of the hopper through the slots onto the shafts. Having wipers 72 extend the full length of all slots 68 thus eliminates any possibility of material from within the hopper coming into contact with shafts 48 and 49.

Screen 38 and its vibrating mechanism is shown in FIGS. 1, 6, 7, 8, 9 and 13. Screen 38 fits within an open supporting structure 90 which has two upwardly extending sides 84 along only the inclined sides. Two L-shaped angle brackets 86, shown in detail in FIG. 13, extend the full length of sides 84 and engage the upward and inward bent ends of the rods making up screen 38. Brackets 86 are held in place by bolts 88, extending through aligned inclined holes through angle brackets 86 and sides 84, being secured in place by matching nuts. Tightening the nuts securing bolts 88 will place tension upon screen 38 while firmly clamping it in place. This tension will result in vibrations of the supporting structure 90 through sides 84 being transmitted more efficiently to screen 38. This attachment means not only provides for an efficient transmission of energy to the screen, but also provides an easy means to replace one screen with another when it is desired to change the size of the mesh.

Figure 7:
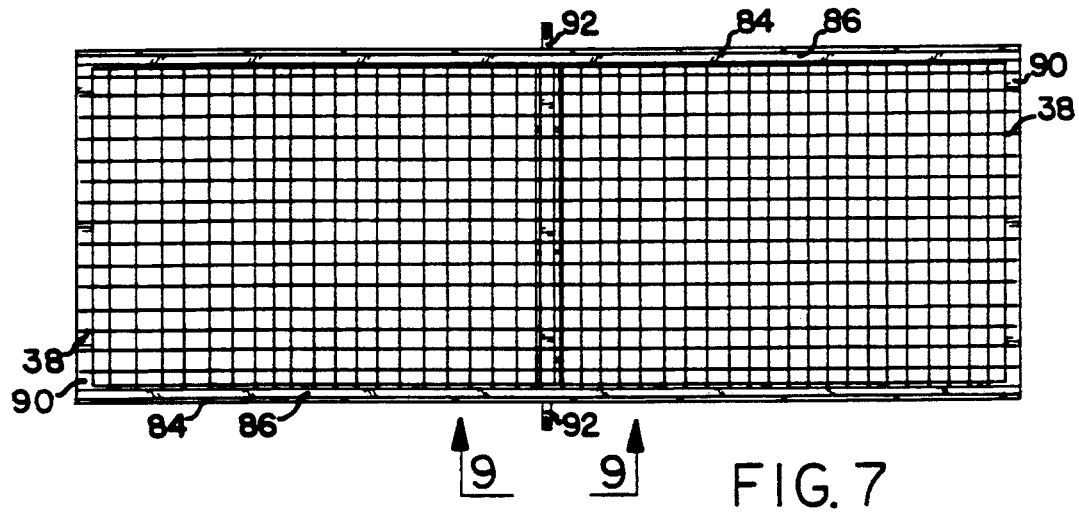
FIG. 7 is a top view of FIG. 1 taken along 7—7 showing the screen.
Figure 8:
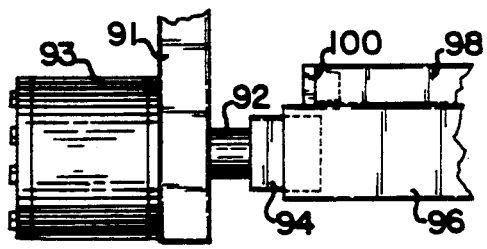
FIG. 8 is a side view of the screen shaft end taken along 8—8 of FIG. 9, with the shaft hydraulic motor and the adjacent portion of the screen supporting structure added to show the attachment means.
Figure 9:
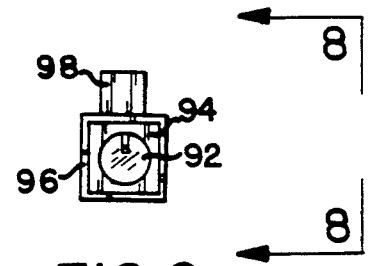
FIG. 9 is the endview of the screen shaft taken along 9—9 of FIG. 7.

FIG. 1 shows screen struts 91 attached to the screen supporting structure 90. Two struts 91 on each side of screen supporting structure 90 are attached to bearings identical to those used for shafts 48, which support the ends of shaft 92. Shaft 92 is driven by a hydraulic motor 93. Since motor 93 and shaft 92 are attached to struts 91 which is part of structure 91, any vibration generated by shaft 92 is coupled to screen 38. The ends of shaft 92 are round, as shown in FIGS. 7, 8 and 9, being the outer end of stub shaft 94 having an opposite square end. These inner square ends of stub shafts 94 fit within and are tied together by an intermediate square shaft extension 96. A second square member 98, welded to one side of square extension 96, has removable caps 100 plugged into each end. Member 98 provides an offset weight which when shaft 92 is rotated provides the vibration. Caps 100 can be removed to change weights, such as by loading it with lead shot, to change the offset weight and obtain different vibration resonant characteristics.

Figure 14:
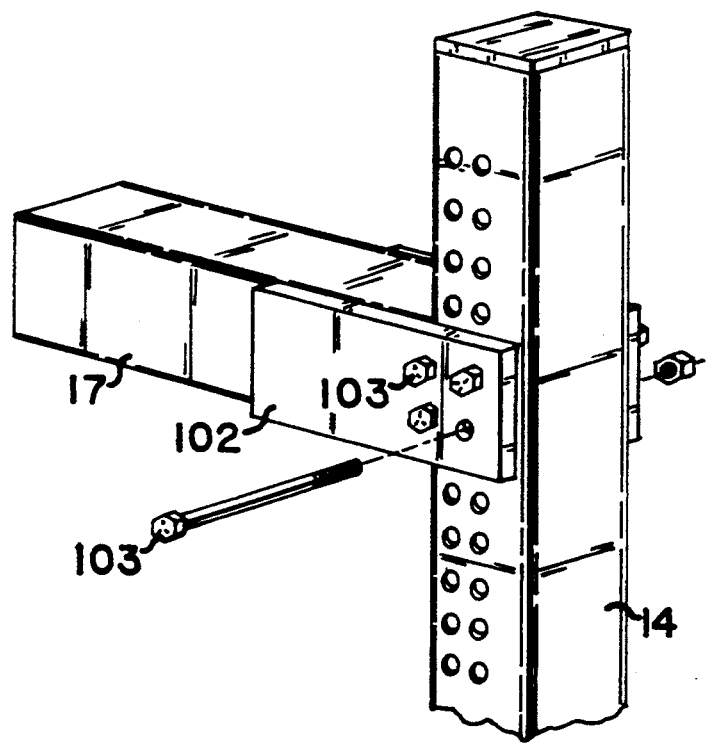
FIG. 14 is the debagging machine supporting structure of FIG. 1 showing one of the supporting stubs for a screen corner.

In FIG. 14 a detail of the attachment of each supporting stud 17 to its respective upright 14 is shown. Plates 102, welded to each side of stud 17, have four holes aligned with each other to permit attachment to structure uprights 14. Uprights 14 have a number of equally spaced aligned holes along its length on each side, spaced the same as the holes through plates 102. Stud 17 can be attached to any set of four holes in upright 14 by four bolts 103 extending through the holes in plates 102 and secured by matching nuts. The inclination of screen 38 can be readily changed by merely bolting plates 102 of studs 17 to uprights 14 at different levels.

As described earlier, motor 30 drives fan 47, motor 60 drives shaft 48, motor 61 drives shaft 49, and motor 93 drives screen vibrator shaft 92. In addition, as shown in FIG. 1, motor 112 drives first conveyor 34, motor 114 drives second conveyor 42, motor 116 drives third conveyor 40, and motor 118 drives fourth conveyor 42. All motors and driven shafts are connected together using the same arrangement as shafts 48 and 49. Hydraulic pumps 106, 108, and 110 are mounted on the rear of diesel engine 104 and are driven from its crankshaft using three pulleys and V-belts.

Figure 12:
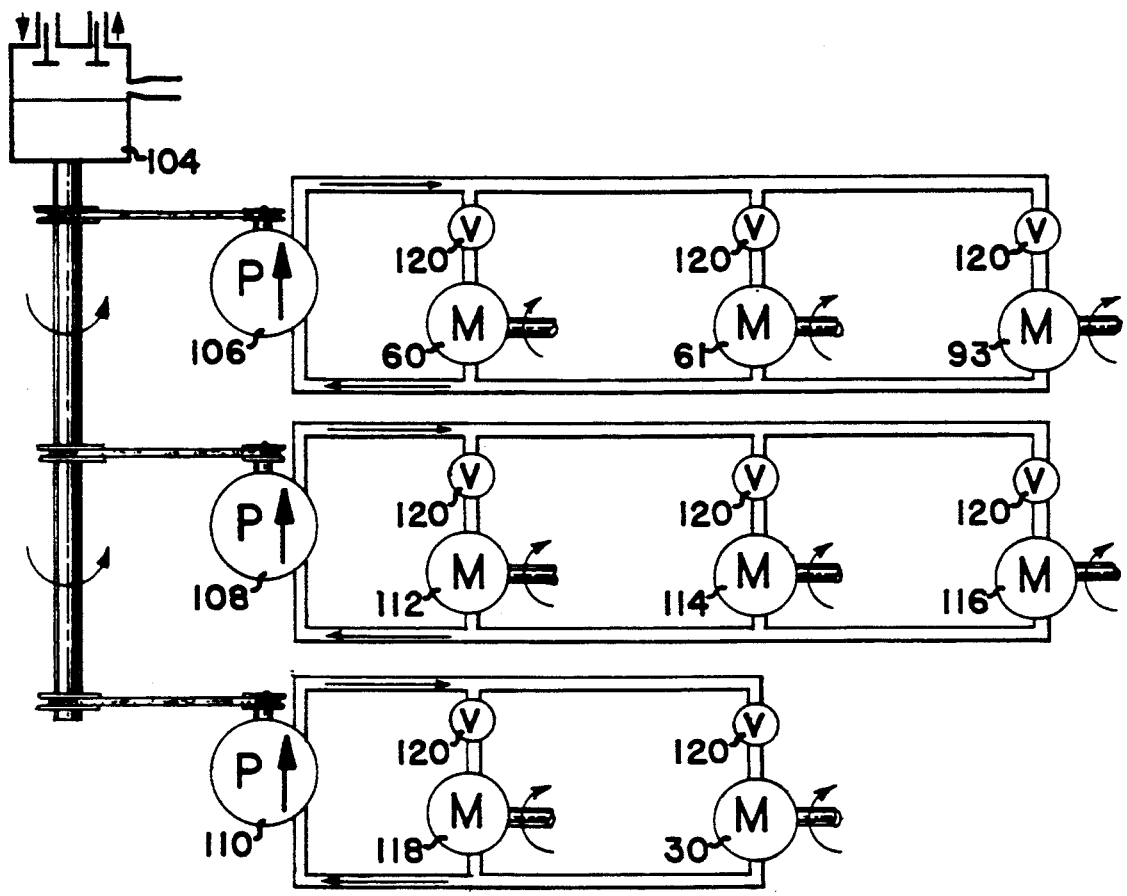
FIG. 12 is a schematic of the hydraulic system.
Figure 13:
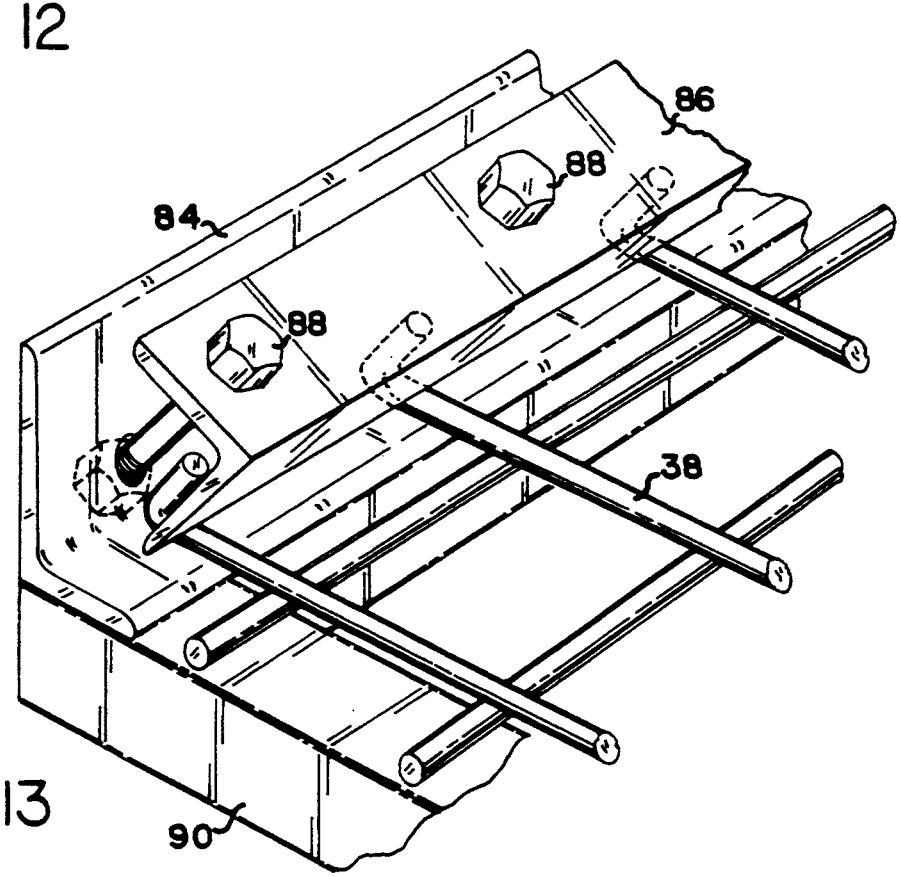
FIG. 13 is a corner of the screen and screen supporting structure showing the attachment means.

These pumps are connected to the various hydraulic motors using pressure and return lines as shown schematically in FIG. 12. As shown here, the upper line from each pump is the pressure line and the lower line is the return line. Diesel engine 104 drives hydraulic pumps 106, 108 and 110 through three pulleys. Hydraulic motors 30, 60, 61, 93, 112, 114, 116, and 118 are each controlled by a valve 120. Using a valve for each motor permits independent and individual speed adjustment of each motor to permit tuning the system to obtain optimum operation.

While this invention has been described with reference to an illustrative embodiment, this description is not intended to be construed in a limiting sense. Various modifications of the illustrative embodiment, as well as other embodiments of the invention, will be apparent to persons skilled in the art upon reference to this description. It is therefore contemplated that the appended claims will cover any such modifications or embodiments as fall within the true scope of the invention.

I claim:

1. An apparatus for processing yard waste contained in trash bags, the apparatus comprising:
   (a) a frame;
   (b) hopper means for receiving filled, closed bags of yard waste, said hopper means mounted to said frame and having two opposing end walls and two opposing side walls;
   (c) rotary cutting means including a plurality of blades flexibly coupled on respective rotatable first and second parallel shafts disposed parallel with the side walls and disposed within the hopper means, said shafts extending between the end walls of the hopper means and rotatably journaled on said frame;

(d) first guard means covering the first parallel shaft and second guard means covering the second parallel shaft, each of said guard means comprising a wall structure having a plurality of respective longitudinal slots each having opposing sides and each situated to accommodate the passage therethrough of one respective blade of the rotary cutting means; and (e) flexible wiper means affixed to each of said guard means and disposed along each opposing side of each longitudinal slot and extending into said slot to thereby wipe against the respective blade of the rotary cutting means passing therethrough and prohibit passage of slashed bag material.

2. The apparatus in claim 1 and further including motor driven conveyor means suspended from said frane for carrying filled trash bags to said hopper frame.

3. The apparatus as in claim 2 and further including screen separator means mounted on said frame downstream of said hopper means for receiving slashed bag material and yard waste thereon and separating said yard waste from the slashed bag material.

4. The apparatus as in claim 3 and further including conveyor means for transporting slashed bags and yard waste exiting said hopper to said screen separator means.

5. The apparatus as in claim 3 wherein said screen separator means includes:

(a) a subframe;

(b) a screen of a predetermined mesh size mounted in said subframe; and (c) means for vibrating said subframe relative to said frame for agitating the yard waste and bag material deposited on said screen by said conveyor means.

6. The apparatus as in claim 5 and further including means for removing slashed bag material from said screen.

7. The apparatus as in claim 6 wherein said means for removing slashed bag material comprises motor driven blower means mounted on said frame for forcibly directing air against said bag material in a predetermined direction at least partially tangent to said screen.

8. The apparatus as in claim 5 wherein said subframe is mounted on said frame at a predetermined angle to the horizontal.

9. The apparatus as in claim 8 having means for changing the angle of said subframe with respect to the horizontal.

10. The apparatus as in claim 1 wherein said wiper means comprises first and second cord reinforcing elastomeric sheets supported in laterally slidable backing plates affixed to said guard means, said first and second sheets at each slot having one edge thereof closely adjacent one another and extending into said longitudinal slot whereby the respective blade of said rotary cutting means is wiped by said one edge of each of said first and second sheets as said blade traverses said longitudinal slot.

11. The apparatus as in claim 1 wherein said slots through said first and second guard means are offset from each other.

12. The apparatus of claim 1 wherein the first and second parallel shafts are disposed within an upper portion of the hopper means.

* * * * *